(12) United States Patent
Ahlgren

(10) Patent No.: US 8,095,147 B2
(45) Date of Patent: Jan. 10, 2012

(54) MULTI-DEVICE LOCATION MONITORING SYSTEM

(75) Inventor: Erik Anders Ahlgren, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1157 days.

(21) Appl. No.: 11/532,300

(22) Filed: Sep. 15, 2006

(65) Prior Publication Data
US 2007/0254626 A1 Nov. 1, 2007

Related U.S. Application Data

(60) Provisional application No. 60/745,931, filed on Apr. 28, 2006.

(51) Int. Cl.
*H04W 24/00* (2009.01)

(52) U.S. Cl. ............... 455/456.1; 455/418; 455/419; 455/456.2; 455/456.3; 340/5.1; 340/539.1

(58) Field of Classification Search ............... 455/456.1, 455/456.2, 456.3, 418–420; 340/5.1, 539.1–539.32
See application file for complete search history.

(56) References Cited

U.S. PATENT DOCUMENTS

| | | | | |
|---|---|---|---|---|
| 5,257,007 A * | 10/1993 | Steil et al. | ............... | 340/539.3 |
| 6,067,018 A * | 5/2000 | Skelton et al. | ............... | 340/573.3 |
| 6,239,700 B1 * | 5/2001 | Hoffman et al. | ......... | 340/539.13 |
| 6,493,552 B1 * | 12/2002 | Hicks | ............... | 455/435.2 |
| 6,693,585 B1 * | 2/2004 | MacLeod | ............... | 342/357.07 |
| 2001/0004600 A1 * | 6/2001 | Son et al. | ............... | 455/456 |
| 2003/0018744 A1 * | 1/2003 | Johanson et al. | ............. | 709/217 |
| 2003/0050038 A1 * | 3/2003 | Haave et al. | ................. | 455/404 |
| 2003/0119568 A1 * | 6/2003 | Menard | ........................ | 455/572 |
| 2004/0002305 A1 * | 1/2004 | Byman-Kivivuori et al. | ............................. | 455/41.2 |
| 2004/0176032 A1 * | 9/2004 | Kotola et al. | ................. | 455/41.2 |
| 2005/0136912 A1 * | 6/2005 | Curatolo et al. | .............. | 455/423 |
| 2005/0153707 A1 * | 7/2005 | Ledyard et al. | ............. | 455/456.1 |
| 2005/0202801 A1 * | 9/2005 | Banet et al. | ................. | 455/404.1 |
| 2005/0228268 A1 * | 10/2005 | Cole | ............................. | 600/420 |
| 2005/0288039 A1 * | 12/2005 | Liou | ........................... | 455/456.6 |
| 2006/0246922 A1 * | 11/2006 | Gasbarro et al. | ............ | 455/456.6 |
| 2007/0135078 A1 * | 6/2007 | Ljung | ........................ | 455/343.1 |
| 2007/0254676 A1 * | 11/2007 | Pedigo et al. | ............. | 455/456.6 |

FOREIGN PATENT DOCUMENTS

| | | |
|---|---|---|
| JP | 05-297107 A | 11/1993 |
| JP | 11-258325 A | 9/1999 |
| JP | 2001-339754 A | 12/2001 |
| JP | 2004-040733 A | 2/2004 |

(Continued)

OTHER PUBLICATIONS

International Preliminary Report on Patentability dated Aug. 1, 2008 issued in corresponding international application No. PCT/IB2006/053992, 7 pages.

(Continued)

*Primary Examiner* — Rafael Pérez-Gutiérrez
*Assistant Examiner* — Lameka J. Kirk
(74) *Attorney, Agent, or Firm* — Snyder, Clark, Lesch & Chung, LLP

(57) ABSTRACT

A method and device are provided for receiving a wireless location tracking activation signal. Location monitoring in initiated based on the received wireless location tracking activation. A geographic location is periodically determined and transmitted to a remote device.

16 Claims, 5 Drawing Sheets

FOREIGN PATENT DOCUMENTS

| | | |
|---|---|---|
| JP | 2004-180237 A | 6/2004 |
| JP | 2005-012973 A | 1/2005 |
| JP | 2005-252613 A | 9/2005 |
| KR | 20030010318 A | 2/2003 |
| WO | WO 98/48396 A1 | 10/1998 |
| WO | WO 00/68907 A1 | 11/2000 |
| WO | WO 2006/024918 A2 | 3/2006 |

OTHER PUBLICATIONS

International Search Report and Written Opinion dated Apr. 16, 2007, issued in corresponding PCT Application No. PCT/IB2006/053992.

J. Calvet, "The role of RFID in the mobile phone", Telektronikk, No. 3, Apr. 2005, XP-002417982, pp. 131-142.

* cited by examiner

MULTI-DEVICE LOCATION MONITORING SYSTEM

RELATED APPLICATIONS

This application claims priority under 35 U.S.C. §119 based on U.S. Provisional Application Ser. No. 60/745.931, filed Apr. 28, 2006, the disclosure of which is incorporated herein by reference.

BACKGROUND

1. Technical Field of the Invention

Implementations described herein relate generally to mobile devices and, more particularly, to using passive near field communication (NFC) to activate tracking of a mobile device.

2. Description of Related Art

Accurate geographic location tracking is advantageous in many commercial and emergency situations. For example, it may be extremely beneficial to enable geographic location tracking of customers or users to provide for rapid location in emergency situations. For commercial initiatives, it may be desirable to charge or bill a user for time actually spent using a service in a known location or for adjusting billing based on the activity being performed. Accordingly, it would be desirable to provide simple and efficient systems for providing such tracking functionalities.

SUMMARY

According to one aspect, a method comprises receiving a wireless location tracking activation signal; initiating location monitoring based on the received wireless location tracking activation signal; periodically determining a geographic location; and transmitting the geographic location to a remote device.

Additionally, the wireless location tracking activation signal is transmitted using a near field communication (NFC) protocol.

Additionally, the receiving may include receiving the wireless signal via a passive wireless receiver.

Additionally, the initiating the location monitoring includes using power from the wireless location tracking activation signal to transmit a signal from the passive wireless receiver to location monitoring logic for initiating the location monitoring.

Additionally, the periodically determining a geographic location may include receiving global positioning satellite signals; and calculating the geographic location based on the received global positioning satellite signals.

Additionally, the periodically determining a geographic location may include receiving cellular radiotelephone location signals; and calculating the geographic location based on the received cellular radiotelephone location signals.

Additionally, the transmitting the geographic location to a remote device may include including the geographic location in cellular radiotelephone registration signals; and periodically transmitting the cellular radiotelephone registration signals to an antenna associated with a cellular service provider.

Additionally, the transmitting the geographic location to a remote device may include establishing a wireless connection with a wireless access point via a wireless network; and periodically transmitting the geographic location to the wireless access point.

Additionally, the wireless network is an IEEE 802.11 wireless network.

Additionally, the method may include storing the geographic location in a memory; and transmitting the geographic location to the remote device from the memory.

Additionally, the method may include receiving a wireless location tracking deactivation signal; and using power from the wireless location tracking deactivation signal to terminate the location monitoring wireless signal is associated with information identifying the first mobile device.

According to another aspect, a mobile device includes a passive wireless transceiver, a geographic location device, and a wireless transceiver. The passive wireless receiver receives a first activation signal from another mobile device, and transmits a second activation signal using power from the first activation signal. The geographic location device receives the second activation signal, receives location monitoring signals from remote location monitoring devices in response to receiving the second activation signal, calculates geographic location information based on the received location monitoring signals, and transmits a geographic location information signal including the geographic location information. The wireless transceiver receives the geographic location information signal, establishes a wireless connection with a remote device in response to receiving the geographic location information signal, and transmits the geographic location information to the remote device via the wireless connection.

Additionally, the passive wireless transceiver receives the first activation signal via a near field communication (NFC) protocol.

Additionally, when transmitting the second activation signal, the passive wireless receiver is configured to transmit the second activation signal via a bus.

Additionally, the mobile device includes a mobile telephone.

Additionally, when establishing a wireless connection, the wireless transceiver is configured to establish a cellular radiotelephone wireless connection with the other mobile device.

Additionally, when establishing a wireless connection, the wireless transceiver is configured to establish a wireless data connection with the other mobile device.

According to yet another aspect, a network device comprises means for receiving a first location tracking activation signal using a near field communication (NFC) protocol; means for transmitting a second location tracking activation signal in response to receiving the first location tracking activation signal, the second location tracking activation signal causing location monitoring logic within the network device to power up; means for determining a geographic location of the network device upon power up of the location monitoring logic; and means for transmitting the determined geographic location to a remote device.

Additionally, power for transmitting the second location tracking activation signal may be drawn from the first location tracking activation signal

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION OF EMBODIMENTS

The following detailed description of the invention refers to the accompanying drawings. The same reference numbers in different drawings may identify the same or similar elements. Also, the following detailed description does not limit the invention.

A method is described for passively activating geographic location tracking or monitoring based on a location tracking activation signal received from another device.

Exemplary System

Figure 1:
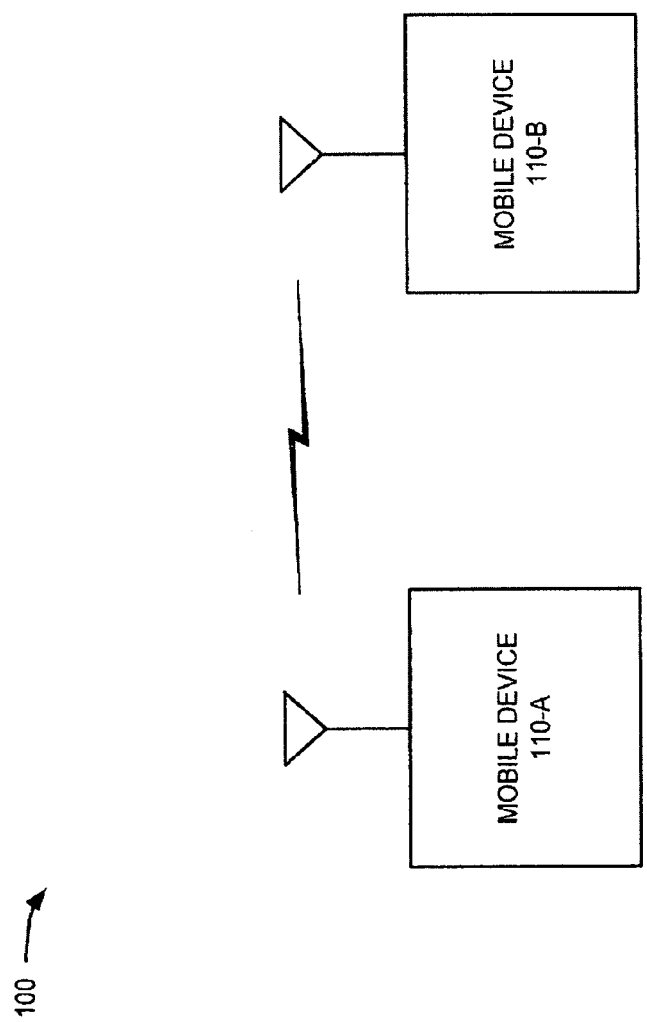
FIG. 1 is a diagram of an exemplary system in which systems and methods consistent with principles of the invention may be implemented.

FIG. 1 is a diagram of an exemplary system 100 in which systems and methods consistent with principles of the invention may be implemented. As illustrated in FIG. 1, system 100 may include mobile device 110-A and 110-B, referred to collectively as "mobile devices 110." The number of mobile devices illustrated in FIG. 1 is provided for simplicity. In practice, a typical system may include more mobile devices than illustrated in FIG. 1.

Mobile devices 110 may include cellular radiotelephones with or without a multi-line display; Personal Communications System (PCS) devices that may combine a cellular radiotelephone with data processing, facsimile and data communications capabilities; Personal Digital Assistants (PDAs) that can include a radiotelephone, pagers Internet/intranet access, Web browser, organizer, calendar and/or a global positioning system (GPS) receiver; laptop and/or palmtop receivers or an appliance that includes a radiotelephone transceiver; and/or other similar types of devices. Mobile devices 110 may also be referred to as "pervasive computing" devices.

In one implementation consistent with the principles of the invention, mobile devices 110 may communicate wirelessly using a number of short distance wireless communication protocols. For example, mobile devices 110 may communicate using the near field communication (NFC) protocol, which is a short-range wireless connectivity standard that uses magnetic field induction to enable communication between devices when they are touched together or brought within a few centimeters of each other. Mobile devices 110 may also communicate using one or more other short distance wireless communication protocols, such as the Bluetooth protocol, the IEEE 802.11 protocol, etc. that may operate at longer distances.

Exemplary Mobile Device Configuration

Figure 2:
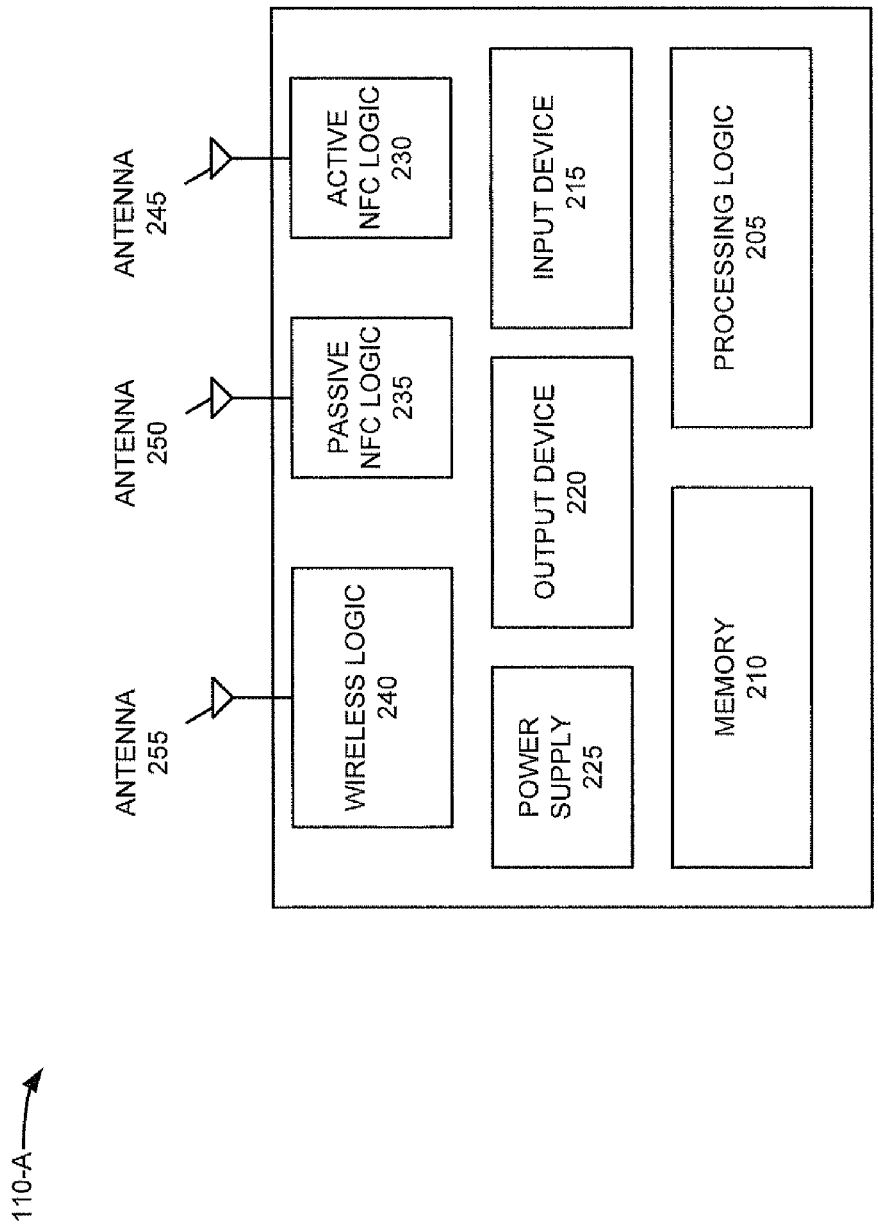
FIG. 2 is a diagram of an exemplary mobile device of FIG. 1.

FIG. 2 is an exemplary diagram of mobile device 110-A. It will be appreciated that mobile device 110-3B may be similarly configured. As illustrated, mobile device 110-A may include processing logic 205, a memory 210, an input device 215, an output device 220, a power supply 225, active NFC logic 230, passive NFC logic 235, location monitoring device 240, wireless logic 245, and antennas 250-265. It will be appreciated that mobile device 110-A may include other components (not shown) that aid in receiving, transmitting, and/or processing data. Moreover, it will be appreciated that other configurations are possible.

Processing logic 205 may include any type of processor or microprocessor that may interpret and execute instructions. In other implementations, processing logic 205 may be implemented as or include an application specific integrated circuit (ASIC), a field programmable gate array (FPGA), or the like. Memory 210 may include a random access memory (RAM) or another type of dynamic storage device that may store information and instructions for execution by processing logic 205, a read only memory (ROM) or another type of static storage device that may store static information and instructions for the processing logic 205, and/or some other type of magnetic or optical recording medium and its corresponding drive for storing information and/or instructions.

Input device 215 may include a device that permits a user to input information to mobile device 110-A, such as a keyboard, a keypad, a mouse, a pen, a microphone, one or more biometric mechanisms, and the like. Output device 220 may include a device that outputs information to the user, such as a display, a printer, a speaker, etc. Power supply 225 may include a battery, or the like, for providing power to the components of mobile device 110-A.

Active NFC logic 230 may include a transmitter device capable of transmitting data and control signals using the NFC protocol. For example, in one exemplary implementation, active NFC logic 230 may transmit an activation signal to another mobile device that causes the other mobile device to activate its location monitoring logic. Active NFC logic 230 consumes power from power supply 225 when transmitting data and control signals.

Passive NFC logic 235 may include a receiver device capable of receiving data and control signals using the NFC protocol. Unlike active NFC logic 230, passive NFC logic 235 does not consume power from power supply 225. Instead, passive NFC logic 235 may receive a carrier field from another mobile device and use the power from that carrier field to activate location monitoring logic 240. Thus, passive NFC logic 235 does not consume power when receiving data and control signals, but rather draws its operating power from the electro-magnetic field provided by the other mobile device. In another implementation, passive NFC logic 235 may be initially provided in a non-powered state, but may draw power from power supply 225 in response to a received NFC signals. In one implementation consistent with the principles of the invention, passive NFC logic 235 may transmit a location tracking activation signal to location monitoring logic 240 in response to receiving a location tracking activation signal from another mobile device (or other device). Passive NFC logic 235 may transmit the location tracking activation signal, for example, via a bus within mobile device 110-A.

In one implementation consistent with principles of the invention, location monitoring logic 240 may include a GPS receiver or other chipset suitable for tracking or otherwise acquiring or calculating a geographic or spatial position of mobile device 110-A. In other exemplary implementations, location monitoring logic 240 may include logic configured to use multiple cellular radiotelephone signals to calculate a geographic location. Location monitoring logic 240 may interface with processing logic 205, memory 210, and power supply 225 by way of one or more busses (not shown). Additionally, location monitoring logic 240 may also interface with one or more antennas 250-265 to receive one or more location-related signals.

In one specific implementation, location monitoring module 220 may include a twelve-channel GPS (global positioning system) receiver capable of receiving up to twelve simultaneous GPS satellite signals via antenna 260. As is known in the art, the GPS system is comprised of 27 GPS satellites (24 active and 3 backups) each configured to orbit the earth twice each day. The positions of the satellites are such that at least four GPS satellites are "visible" in the sky at any one time. Each satellite generates a radio signal include time and date, latitude, longitude, satellite identification information and ephemeris data. Ephemeris data may include information such as satellite health, position in the sky, and availability.

In order to accurately track the location of mobile device 110-A in two dimensions (e.g., no altitude or z-direction) signals from at least three satellites should be received, thus resulting in a known location on the Earth's surface using a concept known as 3-D trilateration. In generally, trilateration works because the speed of the satellite signals and their respective locations are known. By accurately synchronizing the clocks on the mobile devices and the satellites, a time taken for the GPS receiver to "receive" a signal from each satellite may be used to identify the distance from the satellite to the receiver. Once distances from at least three satellites have been determined, the receiver's location may be determined, since there will be only one point on the Earth's surface that meets each of these distances. For more precise location identification including the receiver's altitude, a fourth satellite signal may be required. It should be understood that signals from more that four satellites may also be received at any one moment, thereby enhancing the performance of location monitoring logic 240.

In one implementation consistent with principles of the invention, location monitoring logic 240 may include a local memory (not shown) for storing satellite ephemeris or other data for a predetermined period of time. Alternatively, location monitoring logic 240 may interconnect with memory 210 for storage of this information.

Wireless logic 245 may include a transceiver device capable of transmitting and receiving data and control signals using a wireless communications protocol such as a cellular radiotelephone protocol (e.g., OSM (global system for mobile communications), PCS personal communication services), FDMA (frequency division multiple access), CDMA (code division multiple access), TDMA (time division multiple access), etc.). In additional implementations, wireless logic 245 may use short distance wireless communication protocols such as the Bluetooth protocol, one or more of the ISLE 802.11 protocols, the WiMax protocol, the Ultra Wideband protocol, or any other suitable wireless communication protocol.

Antennas 250-265 may include, for example, one or more directional antennas and/or omni directional antennas.

As will be described in detail below, mobile device 110-A, consistent with the principles of the invention, may initially establish a short distance wireless connection with another device, such as mobile device 110-B. In response to this connection, location monitoring logic 240 of mobile device 110-A may begin tracking or identifying the location of mobile device 110-A. Once calculated, the location information may then be relayed or otherwise transmitted to mobile device 110-B or another remote device via wireless logic 245. Mobile device 110-A may perform these operations and other operations in response to processing logic 205 executing software instructions contained in a computer-readable medium, such as memory 210. A computer-readable medium may be defined as a physical or logical memory device and/or carrier wave.

The software instructions may be read into memory 210 from another computer-readable medium or from another device via, for example, Active and Passive NFC logic 230 and 235 or wireless logic 245. The software instructions contained in memory 210 may cause processing logic 205 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

Figure 3:
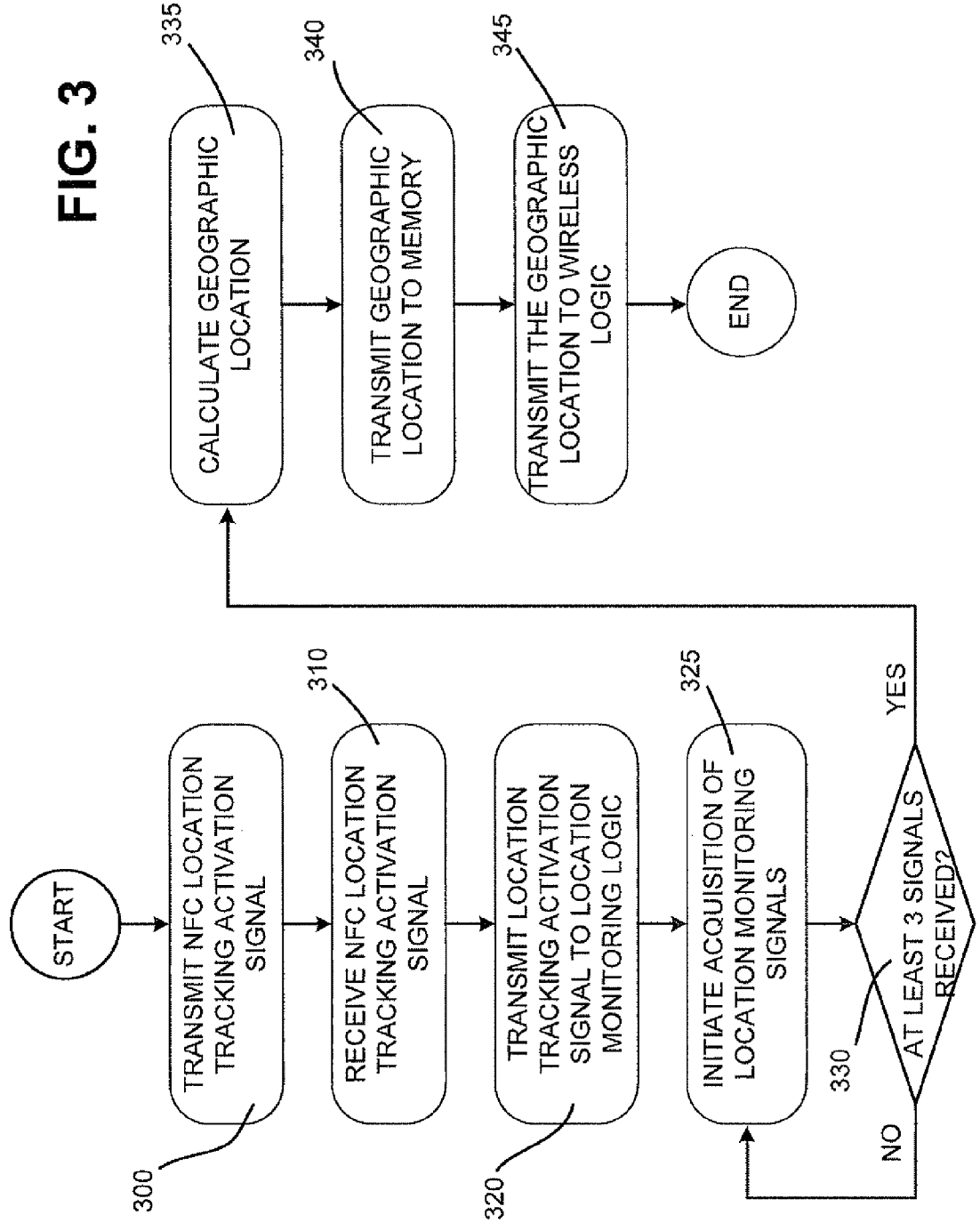
FIG. 3 is a flowchart of an exemplary process for activating geographic location tracking.

FIG. 3 is a flowchart of an exemplary process for enabling location monitoring via a short distance wireless connection in an implementation consistent with the principles of the invention. It will be assumed for this process that mobile device 110-B wants to establish a short distance wireless connection with mobile device 110-A. It is further assumed that scanning has been deactivated on mobile device 110-A. Thus, mobile device 110-A devotes no power to NFC active logic 230, NFC passive logic 235, or wireless logic 240. Mobile device 110-A may be considered as operating in a low power (or nearly no power) mode.

Processing may begin with mobile device 110-B transmitting an NEC location tracking activation signal to mobile device 110-A (act 300). Mobile device 110-B may transmit the location tracking activation signal via NEC active logic 230. The sending of the location tracking activation signal may be triggered by some event. For example, in one implementation consistent with the principles of the invention, a user of mobile device 110-B may cause mobile device 110-B to transmit the location tracking activation signal in response to a command from the user (e.g., the user pressing one or more buttons on mobile device 110-B). In an alternative implementation, mobile device 110-B may transmit the location tracking activation signal without the user's input (e.g., in response to a program running on mobile device 110-B). In one exemplary implementation, mobile device 110-B may transmit information identifying a particular device to which mobile device 110-B desires to establish a connection as part of or in addition to the activation signal.

For the purposes of this embodiment, it should be assumed that mobile device 110-A is in close proximity to mobile device 110-B. Mobile device 110-A may receive the location tracking activation signal from mobile device 110-B (act 310) via, for example, passive NFC logic 235. Passive NFC logic 235 may draw power from the location tracking activation signal to transmit a location tracking activation signal (which may be the same as or different from the location tracking activation signal received by passive NFC logic 235) to location monitoring logic 240 (act 320). By using passive NFC logic 235, a user of mobile device 110-A is not required to actively enable reception of the location tracking activation signal, although this explicit command may be incorporated into mobile device 110-A, if desired. Mobile device 110-A may transmit the location tracking activation signal to location monitoring logic 240 via a bus within mobile device 110-A. In another implementation consistent with principles of the invention, passive NFC logic 235 may transmit the location tracking activation signal to location monitoring logic 240 by way of one or more busses and through processing logic 205, where it may be modified or supplemented with additional information.

When received by location monitoring logic 240, the location tracking activation signal may cause location monitoring logic 240 to initiate acquisition of location monitoring signals from via one or more of antennas 255-265 (act 325). It is then determined whether at least three location monitoring signals have been properly acquired (act 330). If not, the process returns to act 325 for continued signal acquisition. However, if at least three location monitoring signals have been properly acquired, location monitoring logic 240 may begin calculating the geographic location of mobile device 110-A based on the received location monitoring signals (act 335). Once location monitoring has been activated, calculated location information may be transmitted to memory 210 (act 340).

In an alternative implementation consistent with principles of the invention, receipt of the location tracking activation signal does not initiate location monitoring signal acquisition, but instead initiates calculation and storage of location information based on the location monitoring signals.

In one exemplary embodiment, the calculated location information may include latitude, longitude, time, and date, although additional information may also be generated by location monitoring logic 245. Location monitoring logic 240 may calculate and store location information at a predetermined interval. One exemplary interval is approximately 5 times per second, although less frequent calculations may be performed to reduce memory consumption and processing resources of location monitoring logic 240.

Once generated by location monitoring logic 240 and stored in memory 210, the calculated location information may be transmitted to wireless logic 245 for inclusion in wireless signals transmitted by device wireless logic 245 (act 345). In accordance with one exemplary implementation, status signals transmitted between wireless logic 245 and a cellular radiotelephone provider may include the calculated location information, thereby enabling the cellular provider to identify and track the location of mobile device 110-A. These status signals may be transmitted periodically by mobile device 110-A, or alternatively, may be periodically requested by the cellular provider via wireless logic 245. In another implementation consistent with principles of the invention, wireless logic 245 may, either autonomously, or upon request, transmit the location information to a wireless base station or other similar device associated with the wireless communications protocol being implemented. For example, a location logging device may be associated with a network of 802.11 (g) wireless access points. Upon request of the location logging device, the wireless access points may transmit requests for location information to mobile device 110-A. In response, mobile device 110-A may reply with the stored location information.

By enabling efficient and on-demand location monitoring of user mobile devices 110-A, systems and methods consistent with principles of the invention may enable more accurate billing systems and may enhance safety responsiveness for certain activities. In one implementation, systems and methods consistent with the invention may be implemented within a pay-per-use environment, such as snow skiing, amusement park attendance, park or museum attendance, etc. In such environments, accurate knowledge of where a user is and for how long they remain in each location may be used to accurately charge the user for appropriate usage.

Figure 4:
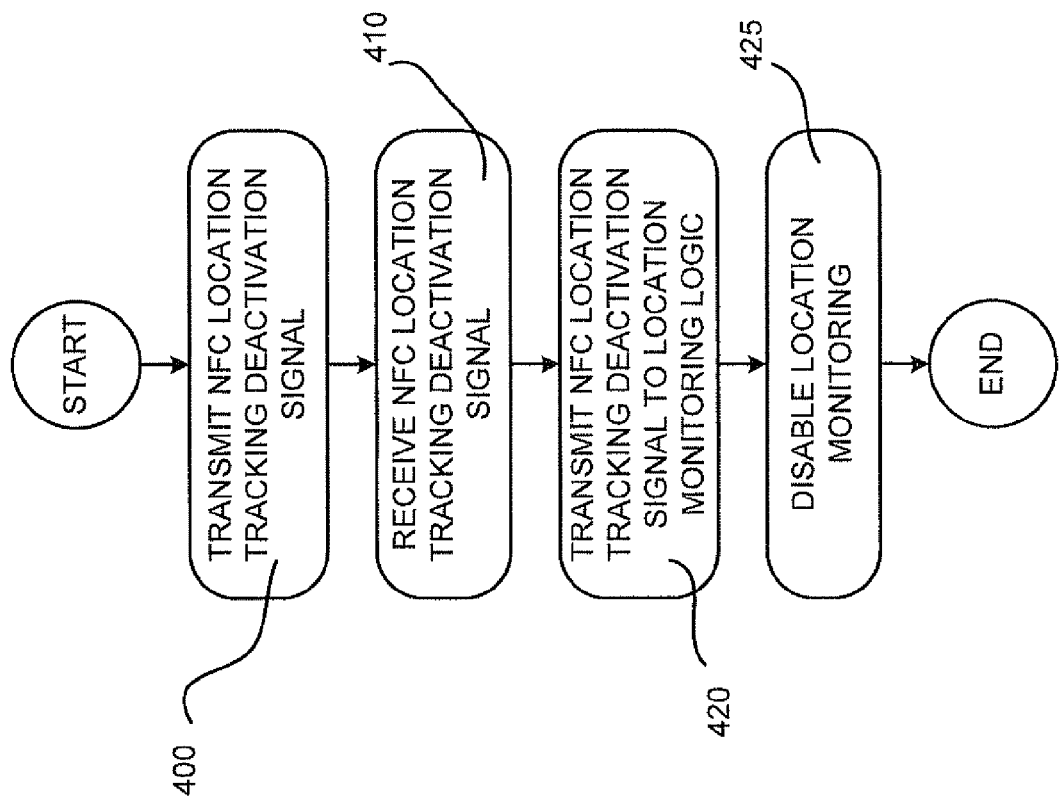
FIG. 4 is a flowchart of an exemplary process for deactivating geographic location.

Upon cessation of the location tracking activity, location tracking may be similarly deactivated in mobile device 110-A. FIG. 4 is a flowchart of an exemplary process for disabling location monitoring via a short distance wireless connection in an implementation consistent with the principles of the invention.

Processing may begin with mobile device 110-B (or other NFC capable device 110) transmitting an NFC location tracking deactivation signal to mobile device 110-A (act 400). Mobile device 110-B may transmit the location tracking deactivation signal via NFC active logic 230.

Mobile device 110-A may receive the location tracking deactivation signal from mobile device 110-B (act 410) via, for example, passive NFC logic 235. As with location tracking activation process described above, passive NYC logic 235 may draw power from the location tracking deactivation signal to transmit a location tracking deactivation signal (which may be the same as or different from the location tracking deactivation signal received by passive NFC logic 235) to location monitoring logic 240 (act 420). By using passive NFC logic 235, a user of mobile device 110-A is not required to actively enable reception of the location tracking deactivation signal.

When received by location monitoring logic 240, the location tracking deactivation signal may cause location monitoring logic 240 to disable or cease acquisition of location monitoring signals from via one or more of antennas 255-265 (act 425). Alternatively, the location tracking deactivation signal may cause location monitoring logic 240 to disable or cease calculation of location information based on the received signals. In yet another implementation, reception of the location tracking deactivation signal may cause location monitoring logic 240 to disable or cease transmission of calculated location information via wireless logic 245.

EXAMPLE

Figure 5:
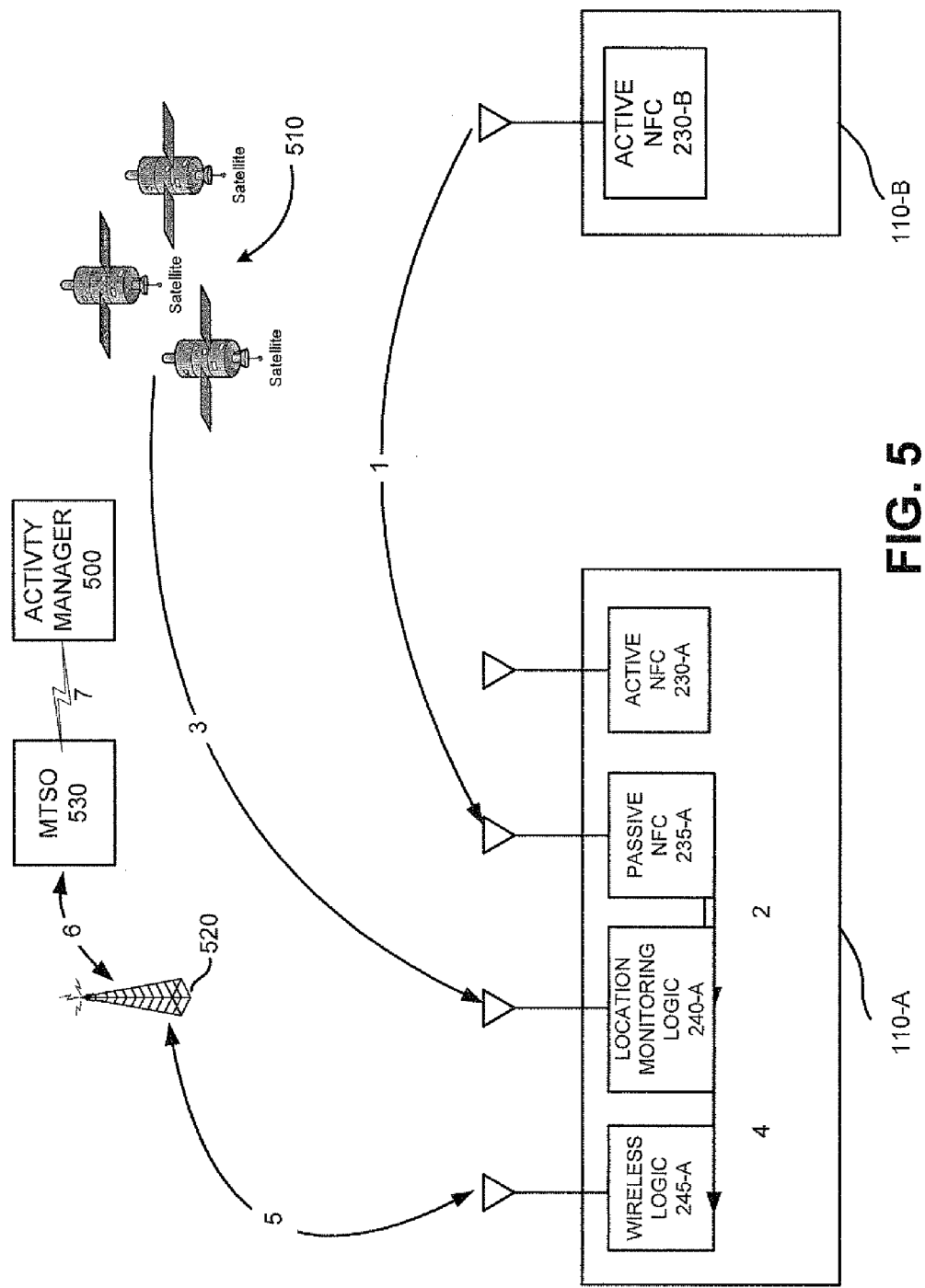
FIG. 5 is an exemplary diagram of the processing described with respect to FIG. 3.

The following example illustrates the above processing. FIG. 5 is an exemplary diagram of one illustrative example of the processing described with respect to FIGS. 3 and 4. For the present example, assume that mobile device 110-B is associated with an activity manager 500 (e.g., a ski resort operator). Further assume that mobile device 110-B wants to enable location tracking for mobile device 110-A, so that the location of mobile device 110-A is subsequently transmitted to activity manager 500. The processing of FIG. 5 may begin with mobile device 110-1B transmitting a location tracking activation signal (signal 1), via active NFC logic 230-B, to mobile device 110-A. As described above, prior to receiving the activation signal mobile device 110-A may operate in a low power (or nearly no power) mode. In this mode, scanning may be deactivated in mobile device 110-A and no power may be devoted to active NFC logic 230-A, passive NFC logic 235-A (which does not require power), location monitoring logic 240-A, and wireless logic 245-A.

Mobile device 110-A may receive the location tracking activation signal via passive NFC logic 235-A. Passive NFC logic 235-A may draw power from the location tracking activation signal to wake up location monitoring logic 240-A (signal 2). In the present example, location monitoring logic 240-A may include a OPS chipset for receiving GPS satellite signals and calculating a location based on the received signals. In response to the activation signal, location monitoring logic 240-A may acquire location monitoring signals from a satellite constellation 510 (signal 3). Thereafter, location monitoring logic 240-A may calculate location information based on the received signals and transmit the location information to wireless logic 245-A (signal 4).

Once the location information has been transferred to wireless logic 245-A, it may be relayed to activity manager 500 via a wireless signal (e.g., a cellular status or registration signal) transmitted to an antenna 520 (e.g., a cellular tower) (signal 5) and to a mobile telephone switching office (MTSO) associated with the antenna 520 (signal 6). MTSO 520 may then relay the location information to activity manager 500 by any suitable means (signal 7). Exemplary means may include a data network such as the Internet, an intranet or LAN, a wireless data network, a cellular network, an analog telephony network (e.g., the public switch telephone network (PSTN)), etc.

In this way, a mobile device may passively receive an instruction to enable location monitoring and, subsequently, provide the generated location information via a wireless communications protocol. By efficiently enabling location tracking, devices and systems consistent with principles of the invention may enable more accurate tracking of users for billing and safety purposes, as well as any other suitable purpose. Using NFC or other short range wireless technologies eliminates the need to manually establish a location tracking session for each user.

CONCLUSION

Implementations consistent with the principles of the invention may provide a system for passively enabling location tracking on a mobile device.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while the description above focused on using the NFC protocol to send location tracking activation and deactivation signals, it will be appreciated that other wireless communication protocols could alternatively be used to transmit the activation and deactivation signals.

While series of acts have been described with regard to FIGS. 3-5, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
at a first mobile device, receiving a wireless location tracking activation signal from a separate second mobile device, where the wireless location tracking activation signal is transmitted from the second mobile device to the first mobile device using a near field communication (NFC) protocol;
initiating location monitoring at the first mobile device based on the received wireless location tracking activation signal;
periodically determining a geographic location of the first mobile device; and
transmitting the geographic location of the first mobile device from the first mobile device though a network to a remote device that is separate from the first and second mobile devices,
where the transmitting the geographic location to the remote device includes:
including the geographic location in cellular radiotelephone registration signals; and
periodically transmitting the cellular radiotelephone registration signals to an antenna associated with a cellular service provider.

2. The method of claim 1,
where the receiving includes:
receiving the wireless location tracking activation signal via a passive wireless receiver; and
where the initiating the location monitoring includes:
drawing power from the wireless location tracking activation signal to transmit a signal from the passive wireless receiver to location monitoring logic of the first mobile device for initiating the location monitoring.

3. The method of claim 1, where the periodically determining a geographic location includes:
receiving global positioning satellite signals; and
calculating the geographic location based on the received global positioning satellite signals.

4. The method of claim 1, where the periodically determining a geographic location includes:
receiving cellular radiotelephone location signals; and
calculating the geographic location based on the received cellular radiotelephone location signals.

5. The method of claim 1, further comprising:
storing the geographic location in a memory of the first mobile device; and
transmitting the geographic location to the remote device from the memory of the first mobile device.

6. The method of claim 1, further comprising:
receiving a wireless location tracking deactivation signal; and
using power from the wireless location tracking deactivation signal to terminate the location monitoring.

7. The method of claim 1, where the first mobile device comprises one of a laptop computer, a cellular telephone, or a personal digital assistant.

8. The method of claim 1, where the first mobile device comprises at least one of an input device or an output device.

9. The method of claim 1, where the second mobile device comprises at least one of a laptop computer, a cellular telephone, or a personal digital assistant.

10. The method of claim 1, where the location tracking activation signal is sent from the second mobile device to the first mobile device in response to a user selection at the second mobile device.

11. A mobile device comprising:
a passive wireless receiver to:
   receive a first activation signal from another mobile device,
   transmit a second activation signal using power from the first activation signal,
   receive a first deactivation signal from the other mobile device, and
   transmit a second deactivation signal using power from the first deactivation signal;
a geographic location device to:
   receive the second activation signal,
   periodically receive location monitoring signals from remote location monitoring devices in response to receiving the second activation signal,
   periodically calculate geographic location information based on the periodically received location monitoring signals,
   periodically transmit a geographic location information signal including the geographic location information, and
   cease calculating geographic location information upon receiving the second deactivation signal; and
a wireless transceiver to:
   receive the geographic location information signal,
   establish a wireless connection with a remote device in response to receiving the geographic location information signal, and
   periodically transmit the geographic location information to the remote device via the wireless connection.

12. The mobile device of claim 11, where the passive wireless transceiver receives the first activation signal via a near field communication (NFC) protocol.

13. The mobile device of claim 11, where when transmitting the second activation signal, the passive wireless receiver is configured to:
   transmit the second activation signal via a bus.

14. The mobile device of claim 11, where the mobile device includes a mobile telephone.

15. The mobile device of claim 11, where the geographic location device consumes no power prior to receiving the second activation signal.

16. A network device comprising:
   means for receiving a first location tracking activation signal from an external device using a near field communication (NFC) protocol;
   means for transmitting a second location tracking activation signal in response to receiving the first location tracking activation signal, the second location tracking activation signal causing location monitoring logic within the network device to power up, where power for transmitting the second location tracking activation signal is drawn from the first location tracking activation signal;
   means for periodically determining a geographic location of the network device upon power up of the location monitoring logic, where said means for determining the geographic location of the network device comprises means for storing location monitoring data;
   means for periodically transmitting the determined geographic location to a remote device;
   means for receiving a wireless location tracking deactivation signal; and
   means for using power from the wireless location tracking deactivation signal to terminate the location monitoring.

* * * * *